United States Patent
Katz et al.

(10) Patent No.: US 6,743,828 B1
(45) Date of Patent: Jun. 1, 2004

(54) REDUCTION IN POLYSTYRENE FOAMS WITH DIBASIC ESTERS

(76) Inventors: Harvey Katz, P.O. Box 273267, Boca Raton, FL (US) 33427; Claudia Iovino, P.O. Box 273267, Boca Raton, FL (US) 33427

( * ) Notice: Subject to any disclaimer, the term of this patent is extended or adjusted under 35 U.S.C. 154(b) by 0 days.

(21) Appl. No.: 09/476,105

(22) Filed: Jan. 3, 2000

(51) Int. Cl.⁷ .................................................. B01F 3/00
(52) U.S. Cl. ...................................................... 516/133
(58) Field of Search .............................. 521/47; 516/133

(56) References Cited

U.S. PATENT DOCUMENTS

| | | | | |
|---|---|---|---|---|
| 4,934,391 A | * | 6/1990 | Futch | 134/40 |
| 5,084,200 A | * | 1/1992 | Dishart | 252/176 |
| 5,223,543 A | * | 6/1993 | Iovino | 521/44.5 |
| 5,629,352 A | * | 5/1997 | Shiino | 521/40.5 |
| 5,712,237 A | * | 1/1998 | Stevens | 510/291 |
| 6,124,377 A | * | 9/2000 | Kaiser | 526/161 |
| 6,153,573 A | * | 11/2000 | Reynolds | 510/203 |
| 9,190,646 | * | 2/2001 | Tellier | 424/70.19 |

* cited by examiner

*Primary Examiner*—Paul R. Michl
(74) *Attorney, Agent, or Firm*—Scott L. Lampert

(57) ABSTRACT

A foam reduction agent consisting of dibasic esters is shown and a process using a liquid contact with polystyrene foam wherein the higher boiling temperature of the dibasic esters and contact with the liquid provides a volume reduction process and less evaporation loss as well as safer transportation of the chemicals and the polystyrene in its reduced state. The resulting reduced sludge is also recyclable to superior quality raw polystyrene foam beads and the reduction agents are recoverable for future use. The resulting sludge also has unexpected beneficial uses hereto for unknown as a waterproofing agent.

23 Claims, No Drawings

REDUCTION IN POLYSTYRENE FOAMS WITH DIBASIC ESTERS

FIELD OF INVENTION

This invention provides chemical agents to reduce polystyrene foam plastics to a compact form using a dibasic ester based chemical agent in liquid form which reduces the polystyrene foam to a sludge like material that is safe to ship and greatly reduces its volume of waste.

BACKGROUND

Polystyrene foam has been used for some time as packing material, insulation material, structural materials and other various uses. The foam has exhibited a great number of useful qualities in a great number of fields. The foams usefulness is based partly on its cost effectiveness, its inherent insulating qualities and easy of forming a great variety of shapes. For instance the food handling industry has found foam packaging to be of great use in the packaging of food products for its consumers. In addition, the building industry has found a great number of uses for the foam. The chief concern for the various uses of the foam has been the amount of waste that is generated by the use of foam products.

Generally speaking, polystyrene foam has caused great concern because of its lack of biodegradability. The foam by its nature takes up a great deal of volume per weight, which has cause many to question its overall usefulness when compared to the possible detrimental environmental impact. The environmental impact includes the accelerated rate that landfill space is being used up at because the foam, in its useful form, takes a great deal of space per weight of waste. Moreover, the transportation of the foam waste is very inefficient due to the volume weight ratio. Typically, the waste material is transported from a restaurant facility to a waste area. This transportation usually involves motor vehicle transport. The vehicles can transport a much greater weight of refuse than can be place in the vehicle due to the large volume the foam takes up. Therefore, the transportation is very inefficient wherein it does not utilize the capacity of the shipping means.

Also, in the industry it has been very difficult to find an effective method of recycling the foam products. This is due in part to the shipping cost described above and the cost of the process of the actual recycling. There is a need for a foam volume reduction method to allow use of more normal plastic recycle and processing equipment. At the present extra compaction steps and very expensive and specialized equipment is required to recycle polystyrene.

One approach to the recycling is to use chemicals to reduce the foam. The basic problem is that the chemicals that are obvious are very toxic to the environment and they are often banned by environmental legislation or regulations. One chemical series, pinene and terpenes such as d-limonene can reduce the foam volume. This approach is interesting but it fails to be an effective method in some cases. Specifically, the cost of d-limonene is directly related to the crop levels of citrus products. When there is a problem with the production of citrus products due to bad growing conditions it directly effects the price to recycle foam products to the point where it may no longer be cost effective.

Moreover, prior approaches evidence an inconsistent activity in collapsing foams that has not previously been addressed in the industry. While heat activation of the terpines has removed this problem (U.S. Pat. No. 5,223,543) it adds to the overall cost of recycling and it involves a volatile environmentally compromising chemical. The chemicals used in this patent were all a problem to ship due to their flash point. They are very volatile and therefore extra precaution has to be used when shipping such products that ultimately does not make it cost effective. The process also was basically vapor phase, providing for possible emissions of vapors which were a Clean Air Act Problem. Thus there is a major need for a foam reduction process that uses low volatility agents.

Also, the use of volatile chemicals presents another problem to the recycling efforts. The chemicals used heretofore would suffer great loss in the recycling process due to evaporation. This would make the recycling materials vary hard to recover to be used again in the recycling process. As such it would add a great deal of cost to the recycling efforts. The evaporated chemicals would also increase the danger of an accident during the recycling process due to unacceptable flash points in the chemicals. This is especially true were the chemicals best performance was aided by the addition of heat to the process. Ultimately, the volatile chemicals and heat required would lead to conditions during the recycling process that would be very dangerous.

An ideal process would have little need for heat activation (contra to U.S. Pat. No. 5,223,543) and would further allow viscous and higher boiling point materials to be used. Ideally, these materials would not require longer residence times prior to recycling. A long time would delay the sequence of breaking down the foam products and shipping of the same. This increase in residence times would add to the overall cost of the recycling process. Also, the need to decrease residence time must be balanced with reduced heat activation in combination with higher boiling point materials whose combination would result in a hereto for unobtainable efficient and safe reactant. In addition, it would be most desirable to have the product or sludge of the foam collapsing reactions that is safely shippable. This is accomplished by the present invention as further described herein. It would also be advantageous to identify effective compounds that insulate the foam reducer market from the wide price variation of the orange crop related d-limonene market.

Also, it would be desirable to have a compound that is environmentally friendly. Part of the major problem with the past use of foam products is that they now occupy a great deal of space in our landfills. Therefore, there is a significant need for an agent that can be used at these landfills on foam, which has already been deposited into landfills. The only way to accomplish this is by the application of a foam reducing agent that has no detrimental side effects on the environment.

DESCRIPTION OF THE INVENTION

SUMMARY

This invention reveals a method to provide rapid destruction of the cells of polystyrene foams by use of a combination of specific chemicals of the class of aliphatic dibasic esters, either alone or with other foam reduction agents and surfactants that are active and which readily attack, with no or little heat activation, polystyrene foam and allows easy recycling. The easy recycling is due to reduced bulk and ease of storage of the collapsed polystyrene foam in sludge foam, ease of processing, and economical transportation prior to recycling. The process involves the exposure of said foams to liquid sprays of specific esters, which have a relatively high boiling point and may be easily and safely transported.

This invention solves the volume problem of polystyrene foam materials and allows the easy and inexpensive shipment of the foam materials after cost effective reduction in volume by use of liquid aliphatic dibasic esters. These materials such as dimethyl glutarate, dimethyl adipate and dimethyl succinate are all effective foam reduction agents. While they have activity individually, as mixtures the action is especially favorable. Moreover, with the addition of small amounts of heat to the process the overall effectiveness is increased while having little effect on the cost of recycling. Also, because of the reactants lower boiling points not much reactant is lost in the heating process. The lower boiling points and benign nature of the reactants makes the reactant process safer than know chemical reactants with highly boiling points.

The use of active chemicals assists in making foamed polystyrene materials easier to incinerate or reprocess. The product of this process and method is solvatable and can be made pumpable and can then be filtered and reprocessed or injected into the furnaces where the high fuel value of the material offers energy savings. If filtered and recycled, high quality polystyrene raw material bead product can be made. Heretofore it has been impossible to cost effectively recycle polystyrene high quality raw material. High quality recycling is important in polystyrene recycling where the recycled product is desirable to be used in the food packing industry. The food packing industry has strict requirements for parts per million of contaminant in the styrene used. The process disclosed herein is the only knows recycling that is cost effective and yields recycled material that would meet the requirements of the food packing industry.

The process of volume reduction has been hampered by high loss due to evaporation. This invention helps cure this problem by discovery of agents with high boiling points, which effect foam reduction in the liquid state with little or no heat added.

The materials used in this method of volume reduction are also recoverable by removal in the recycling process and the majority of compounds used can be easily separated from moisture and volatile organic by a combination of decanting, mutual solubility with other organic compounds and thermal stripping.

The materials are further environmentally nontoxic.

The invention started with identification of the unexpected affinity of the vapors of certain solvents found in perfumes. Identification of the active agent in the process became the key to the initial foam volume reduction process. This material identified was d-limonene. D-limonene vapors acted upon the foam and rapidly reduced the volume. The sorption process, when there was sufficient vapor present, was one that continued until the foam was reduced to a viscous liquid. This aggressive mutual solubility was relatively fast as long as there is a presence of the needed vapors.

This invention furthers the concept of foam reduction by the discovery of a set of chemicals which are as effective as the vapor process noted with d-limonene but which work in a liquid state and thus avoids the need for a vapor saturated atmosphere around the collapsing foam.

The process in this invention would still be a curiosity if the solvents used were some of the common materials such as acetones, methylene chlorides or other relatively toxic compounds. It was known that these strong solvents were effective in dissolving polystyrene foams. Early work assumed key requirements were the relatively high vapor pressure of d-limonene since this chemical and the other known active solvents that were relatively toxic all had high vapor pressures. It was thus assumed at earlier points in the research, that the key conditions were the presence of an active vapor and polystyrene foams. The volatile oils which were the key solvents in earlier work all had relatively low boiling points and thus to make the process effective, restriction of the vapor must also be present. A result was relatively large loss to the atmosphere and the resulting lessening cost effectiveness of the chemical due to this evaporation and vapor loss. This invention discloses a new series of chemicals that have not previously been considered for this purpose since they are not easy to use in the vapor phase. These new dibasic ester uses eliminate much of the loss and further improves fire safety of the recycling or foam reduction process. The extra factor is the removal of the vapor requirement with discovery of liquid phase foam reduction agents.

The formulas used for this invention consist of esters, specifically dibasic esters. These esters, especially the aliphatic dibasic esters such as dimethyl glutarate, dimethyl adipate, and dimethyl succinate (CAS,#119-40-0; 627-93-0; 106-65-0) have rapid reaction with polystyrene foams, again acting as a stress cracking agent to destroy the cell wall webs which are highly stressed, then destroying the inter cellular structure that remains. In addition, through the experimentation that is the subject of the invention disclosed herein it was learned that esters themselves were effectives reactants when small amounts of heat were added to the process. Esters have been disclosed in a U.S. patent to Shiino et al. U.S. Pat. No. 5,629,352. However, that disclosure did not teach or contemplate heating. The addition of small amounts of heat to the ester prior to use as a reactant greatly increases is reactant characteristics. The presence of ester without heat will reduce foam but in a time period that is not efficient for recycling purposes.

The dibasic esters disclosed above are not like the vapor processes used previously for foam reduction, which attack foam by dissolving the foam in the vapors of natural organic compounds. The present chemicals act as liquids. They have boiling points of 196 to 225 degrees C. with a vapor pressure of only 0.2 mm Hg at 20 degrees C. They have an evaporation rate one tenth that of butyl acetate, a common reference. The specific gravity is slightly greater that water and mutual solubility is limited, allowing easy separation from water mixes. The dibasic esters also have low solubility in water and very high solubility in many alcohols so that separation schemes for recovery of the dibasic mix is feasible. The use of the dibasic esters, especially as a mixture, eliminates the large loss due to evaporation of the d-limonene used as the reducing agent in previous reduction and recovery methods. The evaporation of active agents had previously made the process partly ineffective in many applications because of cost. The present invention is cost effective since this loss is very low.

The active agents also have several key property needs. Since they will be going into dumps and trash, they must be environmentally sound. Ideally, they should not be within a range of boiling points and vapor pressures that will either immediately flash off or will over time evaporate to form a vapor layer within a landfill. Looking at solvents, which attack polystyrene foams, nearly all are environmental problem chemicals. One class of chemicals broadly noted as isoprenoid and terpene compounds contain mostly environmentally safe naturally derived compounds, but most of these compounds are relatively volatile and would at least form a vapor layer in a dump situation. The dibasic esters of this invention are of sufficiently low volatility that they do not form an indump layer. This removes future problems of large vapor escape if the dump top impermeable layers are destroyed or damaged by man made or natural phenomena such as earthquakes.

In patents on activation (U.S. Pat. 5,223,543) the emphasis was on d-limonene. This was selected for cost and volatility reasons since prior uses relied on rapid action due to application in exposed areas as activated liquid. The use of a variety of liquid volatilities as long as vapor is generated over an extended time ranging from several hours to several days is also covered. The present use of esters with small amounts of heat, dibasic esters, and d-limonene in combination with esters and dibasic esters, as foam reduction agents is also effective. The present invention is superior in creating a vast reduction in the vapor loss, in preventing vapor layers within disposal dumps, in reduction of loss in reprocessing operations, which are typically at temperatures of over 270 degrees C. Also, the present invention limits reliance on d-limonene, which is can experience unstable pricing and is not easily reclaimed after recycling.

Finally, all of the contemplated reactants described herein may be optionally aided in their reactant effectiveness by including in the reactant process a pretreatment shredding of the polystyrene. The shredding can be effectively accomplished through the use of a hopper that shreds the polystyrene in the first stage of the process. The second stage of the process would have the shredded polystyrene being treaded with one of the disclosed reactants in a holding compartment of the hopper. The resultant foam sludge could then be pumped from the hopper to containers for transportation to waste or recycling locations.

DESCRIPTION OF THE DRAWINGS

There are no drawings with this application.

THE PREFERRED EMBODIMENT

In the most preferred embodiment a mixture of a dibasic ester that is at least one of the group of dimethyl glutarate, dimethyl adipate and dimethyl succinate; and, a surfactant, are sprayed onto pre shredded polystyrene foam waste. This foam waste would typically be from foam serving plates and containers in a fast food restaurant, the residues of packing for food or industrial objects. The foam waste would be shredded in a hopper. The shreds of polystyrene foam would be contained in a compartment of the hopper. The reactant would be sprayed onto the shredded foam waste. The spray and shredded foam combination will rapidly decrease in volume as the foam collapses and would result in the forming of foam sludge and volume of reducing agent. The sludge and reducing agent would be pumped from the hopper compartment into drum type containers and sent to dumps where it occupies a greatly reduced volume or sent to a reprocessor to recover the active agent dibasic esters and the polystyrene polymer. Preferably the reducing agent is ninety eight percent dibasic ester and two percent surfactant.

The process is preferably the same as described above with alternate reactant compositions. However, embodiments are not limited to the pre shredding of the foam waste, the use of a hopper, the pumping of the foam sludge and reactant or the use of drum like containers for transporting the foam sludge and reactant.

In a second embodiment the reactant is at least one of the named dibasic esters is combined with d-limonlene; and a surfactant, whereby the reactant in a liquid state contacts polystyrene foam causing the collapse of the polystyrene cell to form a compact polystyrene gel material that is shippable. Preferably the reactant, or foam reduction agent, is eighty eight percent of the dibasic ester, ten percent d-limonene and two percent of the surfactant. In addition, it is preferred that the surfactant is at least one of an industry standard surfactant known as NP5 and NP9.

In a third embodiment, the reactant is a dibasic esters that is at least one of the group of dimethyl glutarate, dimethyl adipate and dimethyl succinate; d-limonlene; and, a vegetable oil are used as the reducing agent whereby the reactant in a liquid state contacts polystyrene foam causing the collapse of the polystyrene cell to form a compact polystyrene gel material that is shippable. Preferably, the reactant, or foam reduction agent, is fifty five percent vegetable oil, thirty percent dibasic ester and fifteen percent d-limonene. It is also preferred that the vegetable oil is soy oil.

All of the embodiments described above are sprayed onto polystyrene foam. The preferred process is to have the polystyrene foam placed into a hopper wherein the foam is converted to small pieces that can be combined with the reducing agent. The resulting material, sludge and reducing agent are pumped from the hopper to drums for transportation. The process involves the use of a novel mechanical device known as a polystyrene reactant hopper that is to be the subject of another application by the inventor herein.

The resulting material removed from the hopper and placed into drums is a novel article of manufacture that has unique and inventive qualities for waterproofing. Its preferred use is mixing the resulting polystyrene foam sludge with concrete to enhance the concrete's waterproof qualities. In another preferred use of the article of manufacture, the sludge alone or in combination with a rubberizing material may be used as an application such as waterproofing the undercarriage of the car.

The embodiments described herein are not a limitation to invention disclosed by this application but are shown to illustrate the best methods and uses of the invention. Further uses would be obvious to those skilled in the art by a complete review the disclosure made herein.

We claim:

1. A method of reducing a volume of polystyrene foam comprising the steps of:
   (a) providing polystyrene foam; and
   (b) applying to said polystyrene foam an aqueous solution comprising:
      (i) a dibasic ester selected from the group of dimethyl glutarate, dimethyl adipate and dimethyl succinate; and
      (ii) a surfactant;
   to form a gel-like substance which may be applied to an object or materials as a waterproofing agent or recycled into polystyrene foam.

2. A method of reducing a volume of polystyrene foam as recited in claim 1 further comprising the step of heating said aqueous solution containing said polystyrene foam to reduce the reduction time.

3. A method of reducing a volume of polystyrene foam as recited in claim 1 further comprising the step of separating said gel-like substance from said aqueous solution so that said gel-like substance may be applied externally to said object or mixed with said materials to increase said object's or said material's waterproofing characteristics.

4. A method of reducing a volume of polystyrene foam as recited in claim 1 wherein said aqueous solution further comprises d-limonene.

5. A method of reducing a volume of polystyrene foam as recited in claim 1 wherein said aqueous solution further comprises vegetable oil.

6. A method of reducing a volume of polystyrene foam as recited in claim 5 wherein said vegetable oil is a soybean oil.

7. A method of reducing a volume of polystyrene foam as recited in claim 6 wherein said aqueous solution further comprises d-limonene.

8. A method of reducing a volume of polystyrene foam as recited in claim 7 further comprising the step of separating said gel-like substance from said aqueous solution so that said gel-like substance may be applied externally to said object or mixed with said materials to increase said object's or said material's waterproofing characteristics.

9. A method of reducing a volume of polystyrene foam comprising the steps of:

(a) providing polystyrene foam; and (b) applying to said polystyrene foam an aqueous solution comprising:

(i) a vegetable oil; and (ii) a surfactant;

to form a gel-like substance which may be applied to an object or materials as a waterproofing agent or recycled into polystyrene foam.

10. A method of reducing a volume of polystyrene foam as recited in claim 9 further comprising the step of heating said aqueous solution containing said polystyrene foam to reduce the reduction time.

11. A method of reducing a volume of polystyrene foam as recited in claim 9 further comprising the step of separating said gel-like substance from said aqueous solution so that said gel-like substance may be applied externally to said object or mixed with said materials to increase said object's or said material's waterproofing characteristics.

12. A method of reducing a volume of polystyrene foam as recited in claim 9 wherein said vegetable oil is a soybean oil.

13. A method of reducing a volume of polystyrene foam as recited in claim 9 wherein said aqueous solution further comprises d-limonene.

14. A method of reducing a volume of polystyrene foam as recited in claim 13 further comprising the step of separating said gel-like substance from said aqueous solution so that said gel-like substance may be applied externally to said object or mixed with said materials to increase said object's or said material's waterproofing characteristics.

15. A method of reducing a volume of polystyrene foam comprising the steps of:

(a) providing polystyrene foam; and (b) applying to said polystyrene foam an aqueous solution comprising:

(i) a dibasic ester selected from the group of dimethyl glutarate, dimethyl adipate and dimethyl succinate; and (ii) a vegetable oil;

to form a gel-like substance which may be applied to an object or materials as a waterproofing agent or recycled into polystyrene foam.

16. A method of reducing a volume of polystyrene foam as recited in claim 15 further comprising the step of heating said aqueous solution containing said polystyrene foam to reduce the reduction time.

17. A method of reducing a volume of polystyrene foam as recited in claim 15 further comprising the step of separating said gel-like substance from said aqueous solution so that said gel-like substance may be applied externally to said object or mixed with said materials to increase said object's or said material's waterproofing characteristics.

18. A method of reducing a volume of polystyrene foam as recited in claim 15 wherein said aqueous solution further comprises d-limonene.

19. A method of reducing a volume of polystyrene foam as recited in claim 18 further comprising the step of separating said gel-like substance from said aqueous solution so that said gel-like substance may be applied externally to said object or mixed with said materials to increase said object's or said material's waterproofing characteristics.

20. A method of reducing a volume of polystyrene foam as recited in claim 15 wherein said vegetable oil is a soybean oil.

21. A method of reducing a volume of polystyrene foam as recited in claim 20 wherein said aqueous solution further comprises d-limonene.

22. A method of reducing a volume of polystyrene foam as recited in claim 21 further comprising the step of heating said aqueous solution containing said polystyrene foam to reduce the reduction time.

23. A method of reducing a volume of polystyrene foam as recited in claim 22 further comprising the step of separating said gel-like substance from said aqueous solution so that said gel-like substance may be applied externally to said object or mixed with said materials to increase said object's or said material's waterproofing characteristics.

* * * * *